United States Patent [19]
Vermesse

[11] Patent Number: 5,659,454
[45] Date of Patent: Aug. 19, 1997

[54] THERMAL PROTECTION APPARATUS FOR A SECURE ELECTRONIC APPLIANCE, IN PARTICULAR A POSTAGE METER

[75] Inventor: Bernard Vermesse, L'Hay les Roses, France

[73] Assignee: Neopost Industrie, Bagneux, France

[21] Appl. No.: 352,083

[22] Filed: Nov. 30, 1994

[30] Foreign Application Priority Data

Dec. 1, 1993 [FR] France .................................. 93 14381

[51] Int. Cl.$^6$ ...................................................... H02H 5/04
[52] U.S. Cl. .......................... 361/104; 361/106; 361/105; 337/87; 337/371
[58] Field of Search ................................. 361/103–106; 337/86–87, 94–95, 363–364, 370–371; 340/635, 657, 664

[56] References Cited

U.S. PATENT DOCUMENTS 4,035,756  7/1977  Schmitt .
5,274,525  12/1993  Le Meur .................. 361/105

FOREIGN PATENT DOCUMENTS

0165731A3  12/1985  European Pat. Off. .
2675965A1  10/1992  France .

OTHER PUBLICATIONS

French Search Report FR 9314381.

*Primary Examiner*—Jeffrey A. Gaffin
*Assistant Examiner*—Michael J. Sherry
*Attorney, Agent, or Firm*—Sughrue, Mion, Zinn, Macpeak & Seas

[57] ABSTRACT

The apparatus detects the fact that a predetermined temperature threshold, in particular a low temperature threshold, has been crossed, and prevents any subsequent use of the appliance. The apparatus includes a reversible thermostatic switch capable of changing from a first stable state to a second stable state, and of delivering an alarm signal when it finds itself in the second state; and control means co-operating with the switch to respond to the alarm signal by delivering a disable signal for disabling the electronic appliance. According to the invention, the apparatus further includes a DC voltage source (15), an electrical or electronic component (17) capable of taking two states corresponding to said first and second stable states connected in a loop with the voltage source and the switch so that a current passing through the thermostatic switch causes a change from the first state to the second state.

15 Claims, 3 Drawing Sheets

THERMAL PROTECTION APPARATUS FOR A SECURE ELECTRONIC APPLIANCE, IN PARTICULAR A POSTAGE METER

BACKGROUND OF THE INVENTION

1. Field of the Invention

The invention relates to protecting electronic appliances against temperatures that are excessively high or low, to which they might be subjected while they are in operation, or indeed, and above all, while they are not in operation.

The present invention applies very advantageously to secure electronic appliances, in particular postage meters (also referred to as "franking machines"), which contain accounting data representing monetary values (e.g. the postage amounts franked in a postage meter), which values are stored in a memory inside the appliance and must be protected against corruption, whether fraudulent or accidental, due to temperatures outside the temperature range over which the electronic memory of the appliance is guaranteed to retain data correctly.

2. Description of the Related Art

In a postage meter, both the accounting unit (which is implemented around an electronic memory), and also the printer drive mechanism are enclosed in a protected enclosure, access to which is restricted to postal administration employees or to after-sales employees of the manufacturer. For example, such protection is provided by suitable tamper-proof sealing.

Document EP-A-0 099 571 describes such an electronic appliance including an enclosure that is protected both against tampering, and also against electromagnetic interference which might be applied intentionally or accidentally to the circuits of the appliance, and which might corrupt the contents of the accounting memory. A trapdoor is provided to give access to the enclosure, which trapdoor is configured such that once it has been opened, it can no longer be used as a door. Additionally, opening the trap door disables any subsequent operation of the appliance.

Such a postage meter is, therefore, protected against fraud by mechanical tampering or by applying an electromagnetic field which might, for example, enable the contents of the accounting memory to be erased.

Another type of fraud might result from bringing the meter to a temperature that is outside its rated operating temperature range.

For example, by placing the meter in an oven or in a freezer, a dishonest user can easily bring the meter to extreme temperatures at which the accounting memory can be erased, without physically damaging the circuit of the meter.

To prevent such "temperature fraud", it is necessary to detect any attempt to bring the meter to a temperature outside its rated temperature range. This must be done even outside periods when the appliance is in normal use, i.e. it must be possible to detect such fraud even if the meter is switched off or unplugged. It is also necessary to store in a memory the fact that such an attempt has been detected, and to prevent any subsequent use of the appliance.

Attempts to commit fraud by heating the appliance can be detected relatively simply, e.g. by using a well-known technique consisting in placing a thermal fuse in series in the electrical power supply of the meter, the fuse naturally being situated inside the sealed enclosure. For example, if the fuse is calibrated at 70° C., it blows as soon as the inside temperature of the meter exceeds that value, the meter then becoming unusable. To enable the meter to operate again, it is necessary to break the seal on the meter and to change the fuse.

Reliable detection of low temperatures is more difficult.

Document FR-A-2 675 965 proposes a technique of providing a manually-resettable thermostat that is responsive to negative temperatures. Naturally, that component is placed inside the sealed enclosure. More precisely, that component includes two bimetal-disc thermo-sensitive members which control electrical contacts mounted in series, so as to interrupt the power supply to the meter when the temperature leaves the normal operating range, and so as to prevent the meter from operating even when the temperature has returned to that range.

Unfortunately, the protective component proposed by that document is a special component and is therefore costly to industrialize and to produce. Furthermore, that mode of protection, which is solely electromechanical, offers no possibility of adjustment, thus, its accuracy depends entirely on the manufacturing and calibration quality of the bimetal discs. This further increases cost whenever high levels of accuracy, reliability and operating safety are sought.

SUMMARY OF THE INVENTION

An object of the invention is to provide an apparatus offering protection against temperature fraud (cold and/or hot temperatures), which apparatus is easily industrializable using commercially-available electronic components, and is therefore cheap, while offering great accuracy, reliability, and operating safety.

In one of the embodiments proposed below, the hot and/or cold temperature threshold beyond which the apparatus is triggered may be very easily adjusted without significantly increasing the overall cost of the apparatus.

Another object of the invention is to provide an apparatus for monitoring the operating temperature of the meter, whether the temperature monitored is an absolute value or a differential value, i.e. an increase relative to ambient temperature. It is well known that overheating is abnormal in a meter and generally constitutes a warning sign that a breakdown is imminent. The apparatus of the invention makes it possible to detect overheating and to take suitable action, e.g. displaying a message, stopping the meter temporarily, reducing the rate of franking, etc.

In this way, the invention is not limited to fields of fraud detection, but also applies to more general fields of monitoring meter temperature and overheating.

To achieve these various objects, the invention provides an apparatus of the generic type described in above-mentioned Document FR-A-2 675 695, i.e. apparatus for detecting the fact that a predetermined temperature threshold has been crossed by the circuits of a secure electronic appliance, in particular those of a postage meter or "franking machine", and for preventing any subsequent use of the appliance after such crossing has occurred, the apparatus including the following disposed inside a protected enclosure: a temperature detector member capable of changing non-reversibly from a first stable state to a second stable state when said predetermined threshold is crossed, and of delivering an alarm signal when it finds itself in the second state; and control means co-operating with the detector to respond to the alarm signal by delivering a disable signal suitable for preventing any use of the electronic appliance.

According to the invention, the temperature detector member is an electrical member including: a voltage source delivering a DC voltage; an electrical or electronic component capable of taking two states corresponding to said first and second stable states; and a thermostatic switch which, at temperatures situated beyond said predetermined threshold, closes a circuit including the voltage source and the electrical or electronic component so that a current passing through the thermostatic switch causes the electrical or electronic component to go from the first state to the second state.

The temperature detector may very advantageously be a low-temperature detector, the thermostatic switch closing the circuit at temperatures lower than said threshold.

The electrical or electronic component may be a fuse connected in a current mesh also including the voltage source and the thermostatic switch, the alarm signal then in particular being given by the voltage taken at a point that is common to the fuse and to the thermostatic switch.

In a variant, the electrical or electronic component may be an RS bistable having its triggering input connected to the thermostatic switch.

In a first embodiment, the disable signal delivered by the control means is applied to an input of a microcontroller for controlling the electronic appliance, and, in the presence of the disable signal, the microcontroller switches to a mode preventing any use of the electronic appliance. In which case, advantageously, when the disable signal is delivered, it has a variable level representing the voltage delivered by the voltage source of the temperature detector member. The signal is applied to an analog input of the microcontroller (2), and in the event that the voltage is less than a given limit value, the microcontroller delivers a warning message indicating that the battery should be changed and/or switches to a mode preventing any use of the electronic appliance.

In a second embodiment, the disable signal delivered by the control means is applied to an input of a supervisor circuit for supervising the power supply circuit of the electronic appliance. In the presence of the disable signal, the supervisor circuit takes the power supply of the electronic appliance out of service.

For detecting both when the appliance crosses a low temperature threshold, and also when the appliance crosses a high temperature threshold, so as to report any occasion on which the temperature crosses the limits of a rated temperature range, the apparatus is advantageously provided with a common temperature detector that delivers a common warning signal. The temperature detector member includes two thermostatic switches connected in parallel, one of which closes the circuit for temperatures lower than the low threshold, the other switch closing the circuit for temperatures higher than the high threshold. In a variant, two distinct temperature detector members may be provided, each detector member being set to a respective one of the thresholds and delivering a corresponding distinct alarm signal.

The thermostatic switch may be a bimetal thermocontact. In a variant, the thermostatic switch may be an electronic circuit controlled by a thermistor or by a thermocouple.

When the thermostatic switch is an electronic circuit, a non-electronic auxiliary switch is advantageously provided that closes at a temperature in the vicinity of said predetermined threshold but without crossing said threshold. The auxiliary switch is connected in series with the electronic circuit controlled by a thermistor or by a thermocouple, so that said circuit is powered only when the temperature approaches the predetermined threshold.

Also when the thermostatic switch is an electronic circuit, in particular for preventing the electronic appliance from overheating while it is in use, the electronic circuit controlled by a thermistor or by a thermocouple may advantageously also deliver a signal representing the operating temperature of the electronic appliance. This signal is applied to an analog input of a microcontroller for controlling the electronic appliance. In the event that the operating temperature becomes higher than a reference temperature, the microcontroller delivers a warning message and/or switches to a mode temporarily preventing any use of the electronic appliance. The reference temperature may further be a parameter that varies as a function of the temperature of the environment of the electronic appliance, so as to control the microcontroller only when the difference between the temperature of the environment and the operational temperature exceeds a predetermined limit value.

BRIEF DESCRIPTION OF THE DRAWINGS

Other characteristics and advantages of the invention appear on reading the following detailed description of various embodiments given by way of example to show how the teaching of the invention may be applied, and with reference to the accompanying drawings, in which.

DESCRIPTION OF THE PREFERRED EMBODIMENTS

Figure 1:
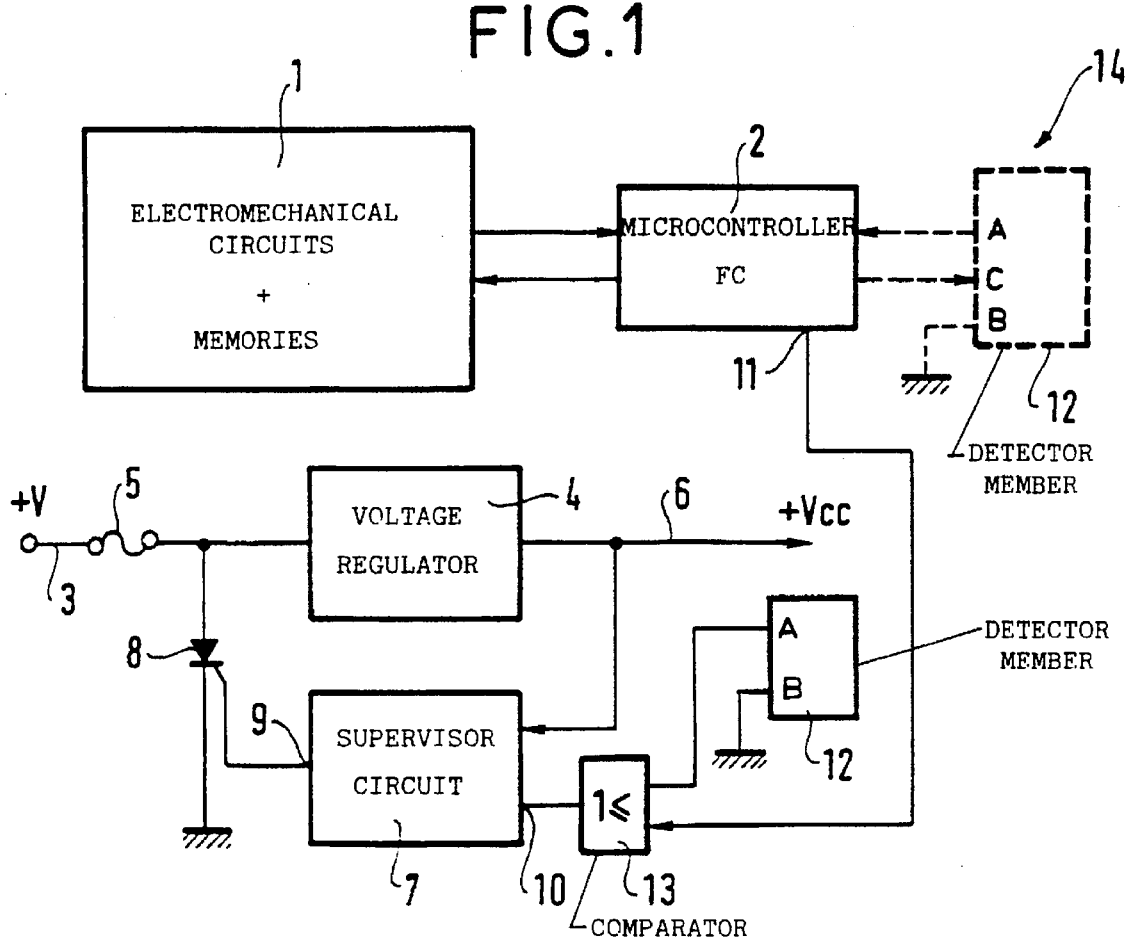
FIG. 1 is an overall view in the form of a block diagram showing a postage meter, and in particular its power supply circuit, the meter incorporating the protection apparatus of the invention.

In FIG. 1, reference 1 designates the various electromechanical circuits of the postage meter or "franking machine", which circuits are not described in detail insofar as they are well known in the art and are not modified to implement the invention. Reference 2 designates the microcontroller for controlling the circuits 1, which microcontroller is associated with various memories (situated inside block 1), in particular a memory containing the counters for summing the postage values franked, the contents of which memory must be protected from any corruption (in particular erasure), whether it be accidental or fraudulent.

Circuits 1 and 2 are powered with a stabilized and regulated voltage $V_{cc}$ produced from a rectified and filtered voltage V applied at 3, via a regulator 4 producing the voltage $V_{cc}$ (generally +5 V) required for operating the various integrated circuits of the meter. A protective fuse 5 is provided at the input so that, if the voltage output at 6 by the regulator 4 exceeds a high limit detected by a supervisor circuit 7 (e.g. a circuit of the MC 3423 type), an output 9 for controlling a thyristor 8 mounted between ground and the downstream terminal of the fuse 5 is controlled by the supervisor circuit such that the thyristor conducting causes a short-circuit, thereby causing the fuse 5 to blow immediately. Such a supervisor circuit, which is known per se, therefore serves to protect the memories containing the franked postage-value counters against malfunction of the regulator.

Certain supervisors, such as the above-mentioned MC 3423, are also provided with an auxiliary input 10 enabling the fuse to be controlled so that it is melted by applying a logic signal. The input may advantageously be connected to an output 11 designated FC ("fuse control") of the microcontroller 2 so that the microcontroller can interrupt meter operation irreversibly by causing the fuse to melt when it discovers a major fault (e.g. of the "inconsistent memory contents" type), or detects an attempt at committing fraud. Naturally, the fuse 5 is disposed inside the sealed enclosure, so that replacement by the user is not authorized.

In accordance with the invention, a temperature detector 12 is provided that is capable of "non-reversibly" detecting the fact that the meter has been exposed to a temperature that is excessively low and/or excessively high, and of delivering a disable signal suitable for preventing any subsequent use of the appliance ("non-reversibly" means that a change of state takes place that can be reversed only by taking action outside the detector member, e.g. by changing an electrical component such as a fuse, pressing a reset button placed inside the sealed enclosure, or applying an external electrical signal that cannot be controlled by the user; the irreversibility is therefore logical irreversibility that can be restored under specific conditions, and it is not absolute physical irreversibility).

The detector member 12 of the invention is essentially in the form of a two-pole network having two terminals A and B. For example, one of the terminals, A, delivers a continuous "high" logic signal when the temperature threshold (low and/or high) has been crossed once, however briefly.

For example, the logic signal, which is referred to herein as the "alarm signal" may be applied to an additional auxiliary input of the supervisor circuit 7 or, as shown, to the single auxiliary input 10 via a comparator 13 that receives the signal output by the detector member 12 and the signal FC output by the microcontroller 11, or else, as shown in dashed lines at 14, by connecting input A directly to one of the inputs of the microcontroller 2, the state of the input being checked by the microcontroller each time the meter is switched on or periodically in a supervision loop.

Figure 2:
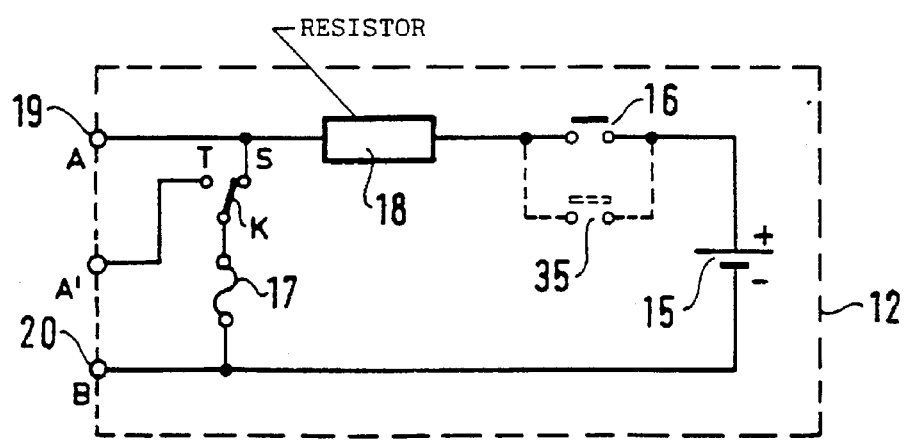
FIG. 2 is a view of the protection circuit of the invention in a first embodiment.

FIG. 2 shows a first embodiment of the member 12 which essentially comprises four components connected in a loop, namely:
- a "battery" 15, e.g. a single lithium cell that is capable of delivering a current of 10 mA at temperatures that may be as low as $-20°$ C.;
- a conventional thermostatic contact 16 having a bimetal blade or disc, and having an open contact when the temperature is greater than $+3°$ C.; if the temperature drops, the contact closes when the temperature reaches $-10°$ C. ($\pm 5°$ C.), and it opens again when the temperature rises again to $0°$ C. ($\pm 3°$ C.);
- a calibrated fuse 17 characterized by its melting current $I_n$, e.g. $I_n=2$ mA, such calibrated fuses being available, for example, from Littlefuse; and
- a current-limiting resistor 18, e.g. calculated to limit the current to $5.I_n$, i.e. 10 mA in the chosen example.

This circuit operates as follows:

Above $3°$ C., i.e. at a normal operating or storage temperature for the meter, the contact 16 is open, no current flows around the loop, and the battery therefore delivers no current. When the temperature drops to a value lying in the range $-5°$ C. to $-15°$ C. (given the tolerance margin of the thermostatic contact which is a cheap common component), the thermostatic contact 16 closes, current of $5.I_n$ flows around the loop, and the fuse 17 melts in a few milliseconds; once the fuse has melted, the battery ceases to deliver any current.

In this way, the circuit 12 constitutes an irreversible detector of low temperatures. Seen between points A and B (terminals 19 and 20), the circuit therefore behaves like a closed contact so long as the meter remains at a temperature greater than $-10°$ C. ($\pm 5°$ C.). Otherwise, the contact is open, the change of state to the open state taking place irreversibly and disabling the meter as indicated above.

In a variant, when the member 12 is connected to an input of the microcontroller 2, the microcontroller may, instead of acting on the main fuse, merely prevent franking from taking place, such prevention advantageously being accompanied by a visual alarm such as a light-emitting diode being switched on, or a "low temperature" message being displayed on an alphanumeric display on the meter.

One of the drawbacks of the module shown in FIG. 2 lies in the fact that, while the sealed portion of the meter is being transported, for example, by the after-sales personnel in the boot or trunk of an automobile, the temperature might drop below the triggering threshold of the detector, thereby causing the fuse to blow.

However, it is possible to take advantage of the fact that the meter is generally transported unsealed, the seal being put in place on the user's premises at the time the meter is installed. Under these conditions, to avoid the fuse blowing during the transport, a switch K in series with the fuse is added to the member 12, the switch having a an "in-service" position (S) and a "transport" position (T), the microcontroller being informed of the position of the switch K via the terminal A' connected to the microcontroller. In the "transport" position, the fuse is isolated from the battery, and it is impossible for it to melt. If the meter is switched on with the switch in the "transport" position, then the microcontroller sees point A' connected to ground and point A floating. In which case, the meter displays a "Detector out of service" message, and prevents franking from taking place. In the "in-service" position, the microcontroller observes that input A' is floating, and that input A is connected to ground via the fuse; the microcontroller then allows franking to take place.

In a variant, the switch K may be replaced by three terminals that can receive a removable strap taking up position T or position S. An absence of strap then corresponds to a test, since the microcontroller observes that A and A' are floating, and deduces therefrom that the strap is in position S, and that the fuse has melted. The meter then displays "Temperature fault".

Yet another variant may consist in mounting the fuse on a support so as to make it removable, the meter then being transported without the fuse which is then installed on its support on installing the meter in the user's premises.

Nevertheless, the module shown in FIG. 2 can be triggered once only, since, in order to reset it, the fuse 17 needs to be changed.

Figure 3:
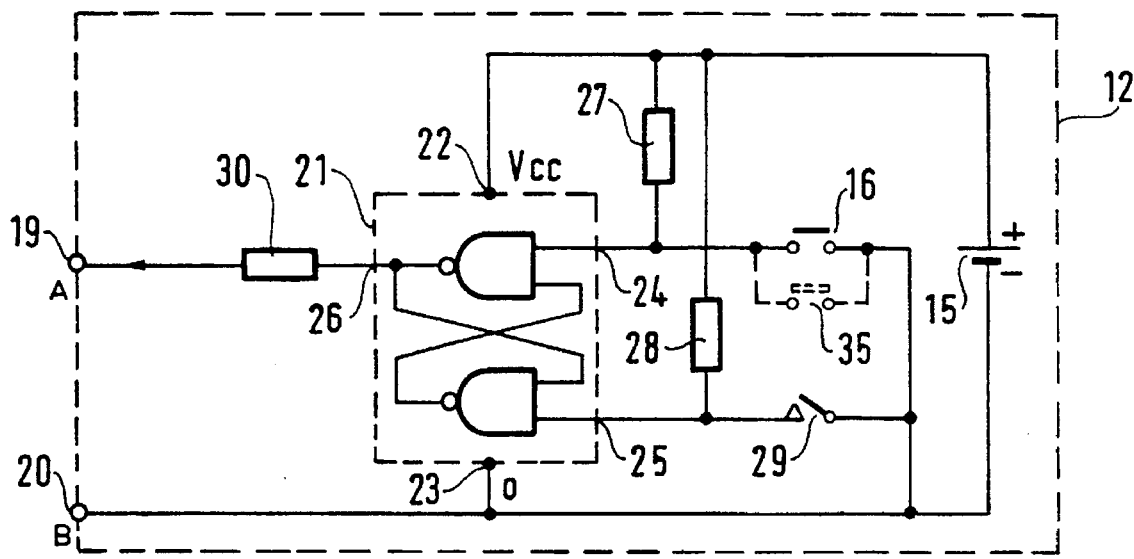
FIG. 3 is similar to FIG. 2, for a variant of the first embodiment.

To avoid this drawback, the fuse 17 may be replaced by an electronic bistable 21 of the RS type having very low energy consumption, as shown in FIG. 3. The bistable 21 has a power-supply input 22 connected permanently to the battery 15 (and therefore powered even if the meter is switched off or unplugged), a grounding input 23, a "Set" logic input 24, a "Reset" logic input 25, and a logic output 26. Inputs 24 and 25 are biased to the positive voltage of the battery by resistors 27 and 28, so that the output 26 is initially at the low logic level. The thermostatic contact 16 is connected between input 24 and ground so that, when it is closed, it forces the output 26 of the bistable to the high level (voltage of the battery 15), the output then remaining in this state until a reset key 29 connected between input 25 and ground is pressed. Naturally, the key is placed inside the sealed enclosure. To provide features identical to those offered by the embodiment shown in FIG. 2, it is necessary merely to apply the signal from the output 26 to terminal A of the circuit 12 via a resistor 30, without requiring a component to be replaced in order to put the appliance back into service.

Figure 4:
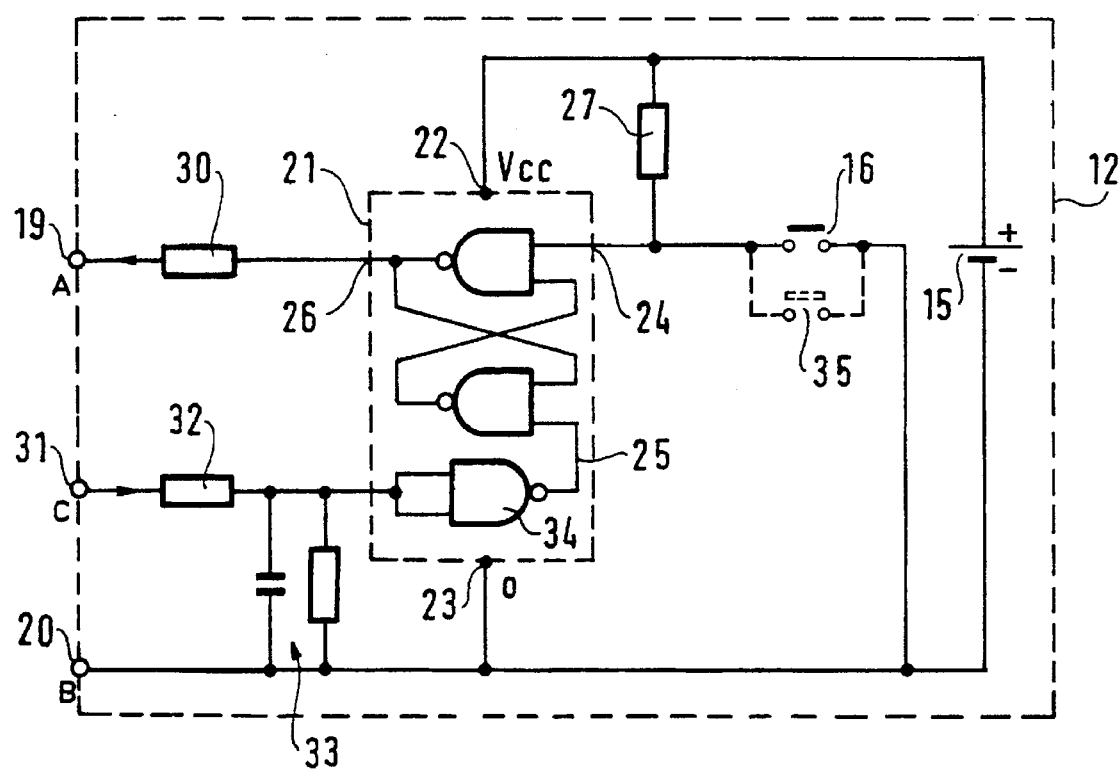
FIG. 4 shows another variant of the first embodiment.

So as not to have to use a specific reset key, this function may be dedicated to the microcontroller 2 by modifying the circuit in the manner shown in FIG. 4. Instead of resistor 28 and the reset key 29, the member 12 then includes an additional terminal 31 (input C) connected to an output of the microcontroller 2 (as shown at 14 in FIG. 1) and connected to the reset input 25 of the bistable 21 via a series resistor 32, a resistance-capacitance (RC) circuit 33, and a gate 34. When the microcontroller positions input C at the high level for long enough, it forces output A to return to the low level, thereby resetting the bistable (the length of time for which the command must be applied to input C depends on the time constant of the circuit 33 for filtering out any untimely commands delivered by the microcontroller, in particular on switching the meter on or off).

This enables the apparatus of the invention to be incorporated into a meter that has a single reset key situated inside the sealed enclosure. Any crossing of the low temperature threshold disables franking as indicated above, and the microcontroller indicates that franking is disabled. To re-enable the meter after the attempt at committing fraud has been detected, it is necessary to break the seal of the meter, and to act on the key. The microcontroller then resets the bistable, and ceases to indicate the "low temperature" fault; the key is then available for other functions that are known per se.

In addition to the above-described embodiments, it is possible to place a second thermostatic contact 35 (FIGS. 2, 3, and 4) in parallel with the thermostatic contact 16, which second thermostatic contact closes when the temperature exceeds a high temperature threshold, e.g. 70° C. As in the preceding case, crossing the high threshold causes the fuse 17 to melt, or the bistable 21 to change state. In particular, this configuration makes it possible to omit the protective thermal fuse that is placed in series with the main fuse in known meters. In this respect, in should be noted that, if a circuit of the type shown in FIGS. 3 and 4 is used, the same result can be achieved with resetting being possible without having to change a component, thereby offering an additional advantage compared with prior systems.

However, connecting two thermostatic contacts in parallel suffers from the drawback that it is not possible to determine whether the triggering results from too high or too low a temperature. To make such determination possible, two distinct circuits may be used, i.e. one circuit per thermostatic contact. The two circuits, which may be powered by the same battery, apply signals to distinct inputs of the microcontroller, where resetting may be common.

One of the drawbacks with using an electronic bistable (FIGS. 3 and 4) as compared with a fuse (FIG. 2) lies in the fact that the battery 15, which delivers current constantly, gradually wears out. To remedy this drawback, it is possible firstly to use integrated circuits such as those of the 74 HC family for the bistable. Such circuits operate even at 2 V (a new battery delivering a voltage of about 3 V, which may drop to 2.5 V at the end of its life), with very low rest currents. Secondly, it may be useful to monitor the voltage of the battery. To this end, the advantage of using circuits of the above-mentioned family for the bistable is that the voltage at the logic output of such a circuit is equal to the powering voltage of the circuit, provided that the current delivered by the output remains low. In the present case, it may be considered that the voltage at point A, corresponding to the high logic level of the bistable, is equal to the voltage from the battery 15. To determine the state of wear of the battery, it is necessary merely to measure the voltage, which can be done easily if the microcontroller has a suitable analog input. Provided that the complementary output of the RS bistable is connected to the analog input, when the microcontroller measures a voltage of greater than 2.5 V at the input, it knows that the temperature threshold has not been crossed, and that the battery is not completely worn out. Knowing the voltage of the battery also enables the microcontroller to manage alarms and messages, e.g. to warn the user that the battery must be changed, when the voltage drops below 2.6 V.

Moreover, in meters provided with clock-and-calender circuits, it is well known that such a circuit is backed up by a battery. If such a meter is provided with a circuit of the invention, it is possible to omit the battery 15 from the circuit 12 by connecting the assembly comprising the fuse 17, resistor 18, and thermostatic contact 16 to the terminals of the clock-and-calender battery. Under operating conditions within the rated temperature range, this addition involves no extra drain on the battery, as noted above. When a bistable 26 is used instead of the fuse, the battery of the clock-and-calender should normally be capable of satisfying the very low additional drain due to the bistable.

A second embodiment of the invention is described below, which embodiment may be applied when the triggering threshold is to be adjustable and/or a narrow tolerance is to be guaranteed for the threshold value without having to use costly components.

In this way, for example, it is possible to provide threshold adjustment and/or tolerance of ±2° C. (as compared with the threshold set by construction of −10° C. ±5° C. in the first embodiment described above).

Figure 5:
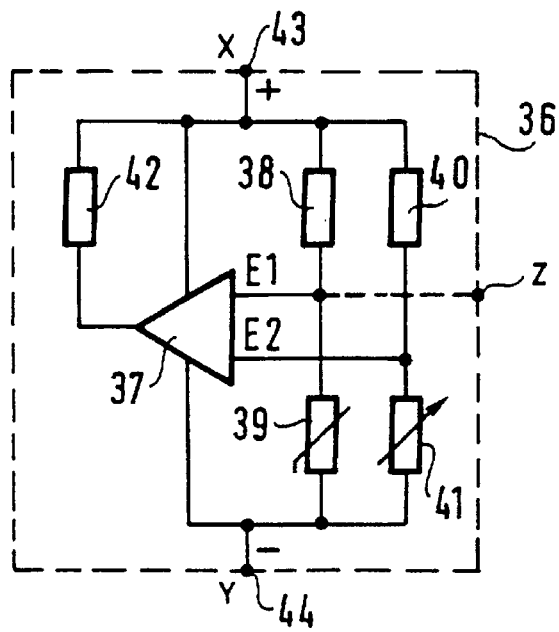
FIG. 5 shows the thermostatic switch used in a second embodiment of the invention.

In the second embodiment, the thermostatic contact 16 shown in FIGS. 2 to 4 is replaced by an electronic circuit using a component that is responsive to temperature, such as an NTC or PTC thermistor, e.g. of the Philips KTY8 series. With reference to the diagram showing circuit 36 in FIG. 5, a comparator 37 has one of its inputs $E_1$ connected to the midpoint of a voltage divider constituted by a fixed-resistance resistor 38 and by a thermistor 39. The other input $E_2$ of the comparator is connected to the midpoint of a divider bridge constituted by a fixed-resistance resistor 40 and by an adjustable-resistance resistor 41. The voltage across input $E_1$ decreases when the temperature increases if the thermistor 39 is an NTC thermistor, and the opposite applies if the thermistor is a PTC thermistor. The adjustable resistor 41 makes it possible to adjust the change-over threshold of the comparator 37, in known manner. If the variation in the voltage across input $E_1$ is insufficient to obtain accurate adjustment by means of resistor 41, an amplifier stage may be interposed between input $E_1$ and the midpoint of the divider bridge 38, 39. When the threshold set by resistor 41 is crossed, current flows through the resistor 42 connected to the output of the comparator 37, so that, with respect to resistor 42, the comparator behaves like a switch that is triggered at a temperature set by resistor 41.

Figure 6:
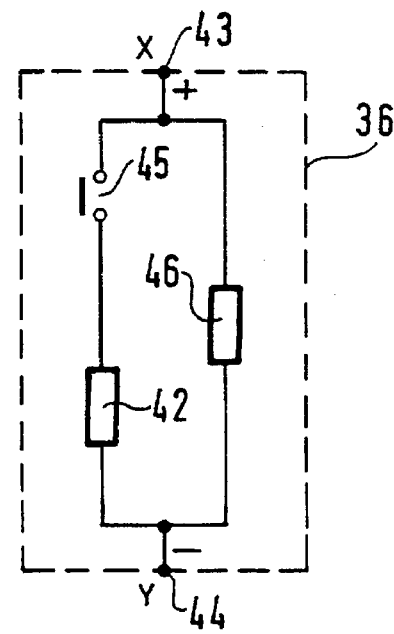
FIG. 6 shows the equivalent electrical circuit to the electronic circuit shown in FIG. 5.

Seen between the terminals 43 and 44, the two-pole network XY behaves in the manner of the equivalent circuit shown in FIG. 6. So long as the temperature threshold is not reached, the equivalent contact 45 is open, the drain of the two-pole network being low in this case and equal to the current flowing through the equivalent resistance 46 of the network of resistors 38, 39, 40, and 41, which equivalent resistor 46 is high. As soon as the temperature threshold is crossed, the equivalent contact 45 closes, thereby giving rise to a large increase in the current drained by the two-pole network, the resistance of resistor 42 being very much lower than the equivalent resistance 46.

Figure 7:
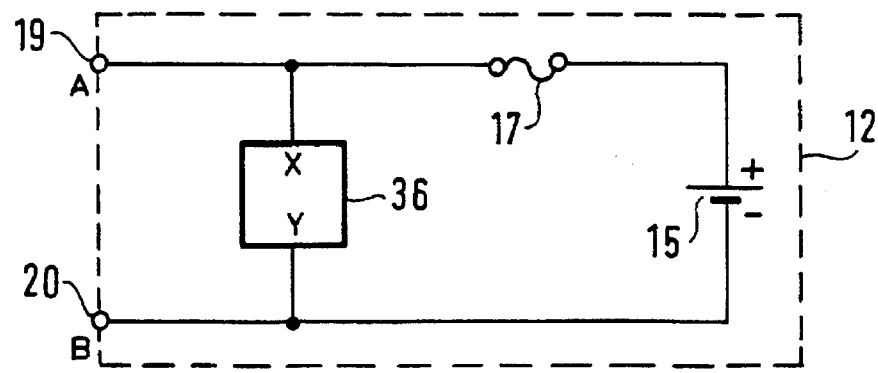
FIG. 7 shows the protection circuit of the invention in the second embodiment, using the circuit shown in FIG. 5.

If, as shown in FIG. 7, circuit 36 is associated with a fuse 17 and with a battery 15, so long as the temperature threshold is not crossed, the contact of the two-pole network remains open, and the battery delivers a very low current, that is significantly lower than the current $I_n$ required to melt the fuse. As soon as the temperature threshold is reached, the drain of the two-pole network considerably exceeds the current $I_n$ and the fuse melts. The same features are provided as those described with reference to FIG. 2 for a thermostatic contact, with it being possible in this case to adjust the temperature threshold accurately. If terminal A of the circuit shown in FIG. 7 is connected to the analog input of the microcontroller, the microcontroller controls the voltage supplied by the battery if the fuse is present, and detects zero voltage in the event that the fuse has blown.

As above, the fuse 17 may be replaced with a bistable. In which case, the output of the comparator controls the input of the bistable directly. In the same way, it is possible to monitor both a low threshold and a high threshold by providing two comparators 37 and two pairs of resistors 40 and 41 in circuit 36, it being possible for the divider bridge 38, 39 to remain common to both comparators.

Furthermore, the above description concerning use of a thermistor may also be applied to a thermocouple, on condition that an amplifier stage is provided between the input of the comparator and the thermocouple.

To increase the life span of the battery, it is possible to switch the two-pole network on only when the temperature approaches the threshold to be monitored.

Figure 8:
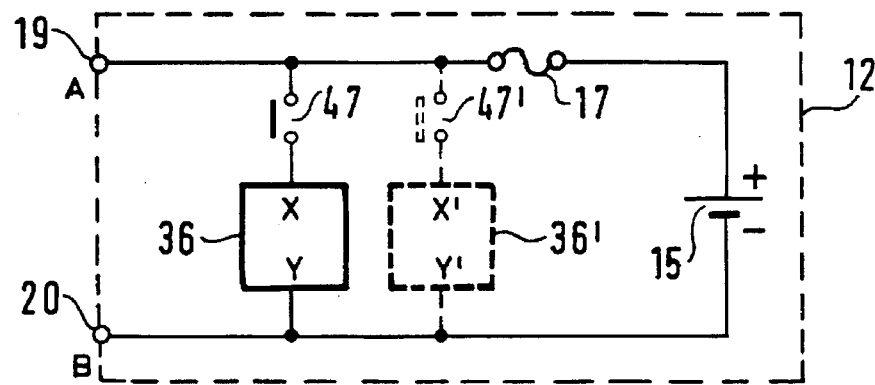
FIG. 8 shows an improved variant of the apparatus shown in FIG. 7.

In which case, as shown in FIG. 8, another thermostatic contact merely needs to be associated with the two-pole network, the two-pole network 36 being connected in series with an auxiliary thermostatic contact 47. Assuming that the two-pole network is set to a triggering temperature of −6° C., and that the auxiliary thermostatic contact 47 closes for temperatures below 0° C., then, for nearly all of the usual temperatures, e.g. temperatures in the approximate range 10° C. to 30° C., contact 47 remains open, the two-pole network 36 consumes no current, and there is no wear on the battery 15. As soon as the temperature becomes negative, the contact closes, the two-pole network 36 is switched on, the battery delivers current and fine temperature monitoring begins. If the temperature rises again, the contact 47 opens again, and the two-pole network is switched off. Conversely, if the temperature drops below −6° C., the two-pole network causes the fuse 17 to blow.

The same scheme may be applied to monitoring a high temperature threshold. To this end, the series assembly constituted by the two-pole network 36 and the contact 47 merely needs to be connected in parallel with another series assembly of the same type but, for example, with an auxiliary contact 47' that closes as from 65° C. and that is associated with a two-pole network 36' set to a threshold of 70° C. In this way, a fine monitoring member is obtained for the rated temperature range of the meter, which member is switched on only when the temperature is in the vicinity of the limits of that range.

In another aspect of the present invention, another field exists in which monitoring the inside temperature of the meter is important, namely the field of breakdown prevention. It is well known that overheating of a meter is a sign that a breakdown is about to occur.

The teaching of the invention may be applied to such monitoring which then takes place only while the meter is operating, and not continuously as above (i.e. regardless of whether the meter is off or on, or unplugged or not).

For example, a meter rated to operate at an ambient temperature lying in the range 0° C. to 40° C. may normally become ten degrees hotter when it operates at maximum speed and power. In which case, it is advantageous to check continuously that the inside temperature of the meter does not exceed 50° C., and, should that temperature be exceeded, to trigger an alarm indicating to the user that the after-sales department must be notified, that the meter must be switched off temporarily to enable the meter to cool down, or that the rate of use must be reduced until the temperature returns to normal.

Since, in this case, the meter is in operation, and therefore switched on, and since the microcontroller has analog inputs, if one of the inputs is connected to the midpoint of a divider bridge constituted by a resistor and by a thermistor (e.g. the voltage taken at point Z of the circuit 36 in FIG. 5), a thermometer is then obtained that is accurate enough to perform the desired function. Cyclically, e.g. once every minute, the microcontroller converts the voltage output by the thermometer and compares the result with a pre-recorded threshold. If the threshold is crossed, the microcontroller triggers the alarm, switches off the meter temporarily, or reduces the operating rate as mentioned above.

Given that temperature phenomena are phenomena that vary slowly, it is possible to modulate the rate at which temperature measurements are taken. For example, when the measured temperature is distant from the threshold, the following measurement could be taken several minutes later, whereas, if the measured temperature is close to the threshold, a measurement could be taken once every second, for example. Such measurement-rate modulation makes it possible to lighten the workload of the microcontroller during normal meter operation.

The above-described measurement mode suffers from the drawback of not measuring the actual temperature rise of the meter, but merely verifying that a maximum temperature is not exceeded. In this way, if the ambient temperature is 25° C. and a normal temperature rise is ten degrees, the monitoring threshold should be placed at 35° C. instead of 50° C. as in the preceding example; but in the event of an abnormal temperature rise of twenty degrees, the inside temperature would rise to 45° C., i.e. a temperature less than the pre-recorded threshold of 50° C.

To remedy this drawback, the meter may be provided with a second thermometer assigned to measuring the ambient temperature of the meter. Advantageously, the ambient thermometer is fixed to one of the metal portions of the meter in contact with the ambient air, or at the very least fixed to a cold portion of the meter, i.e. in a zone where the temperature rise relative to ambient is minimal.

The ambient thermometer is mounted identically to the first thermometer, and it is connected to another analog input of the microcontroller. The microcontroller periodically takes the two temperatures, calculates the differential value corresponding to the temperature rise by subtracting one temperature from the other, and then compares the result with the pre-recorded rated temperature rise. As above, if that rise is exceeded, the alarms and the protective measures are triggered, thereby protecting the meter before a breakdown occurs.

I claim:

1. Apparatus for detecting that a predetermined temperature threshold has been crossed by circuits of a secure electronic appliance, in particular said circuits being of a postage meter or "franking machine", and for preventing any subsequent use of said appliance after said threshold has been crossed, said apparatus comprising the following elements disposed inside a protected enclosure:

a reversible thermostatic switch (16; 35) changing from a first stable state to a second stable state when said predetermined threshold is crossed, and delivering an alarm signal when said switch is in said second stable state; and control means co-operating with said switch to respond to said alarm signal by delivering a disable signal for preventing any use of said electronic appliance;

said apparatus further comprising:

a voltage source (15) delivering a DC voltage;

an electrical or electronic component (17; 21) connected in a loop with said voltage source and said switch, said component taking a first state corresponding to said first stable state and a second state corresponding to said second stable state so that a current passing through said switch causes said electrical or electronic component to go non-reversibly from said first state to said second state.

2. Apparatus according to claim 1, wherein said apparatus comprises a low-temperature detector, said switch closing said circuits at temperatures lower than said threshold.

3. Apparatus according to claim 1, wherein said electrical or electronic component is a fuse (17) connected in a current mesh, said current mesh comprising said voltage source and said switch.

4. Apparatus according to claim 3, wherein said alarm signal is given by a voltage taken at a point (A) common to said fuse (17) and to said switch (16; 35).

5. Apparatus according to claim 1, wherein said electrical or electronic component is an RS bistable (21) having a triggering input (24) connected to said switch (16; 35).

6. Apparatus according to claim 1, wherein said disable signal delivered by said control means is applied to an input of a microcontroller (2) for controlling said electronic appliance, said microcontroller, in the presence of said disable signal, switching to a mode preventing any use of said electronic appliance.

7. Apparatus according to claim 6, wherein said disable signal delivered by said control means has a variable level representing a voltage delivered by said voltage source, said signal being applied to an analog input of said microcontroller (2), said microcontroller, when said voltage is less than a given limit value, performing one of delivering a warning message indicating that said voltage source should be changed and switching to a mode preventing any use of said electronic appliance.

8. Apparatus according to claim 1, wherein said disable signal delivered by said control means is applied to an input of a supervisor circuit (7) for supervising a power supply circuit (4, 5, 6, 8) of said electronic appliance, said supervisor circuit taking said power supply circuit out of service in the presence of said disable signal.

9. Apparatus according to claim 1, for detecting when said appliance crosses a low temperature threshold, and when said appliance crosses a high temperature threshold, said apparatus reporting any occasion on which temperature of said apparatus crosses limits of a rated temperature range, wherein a common temperature detector is provided delivering a common warning signal, said temperature detector member including two thermostatic switches (16, 35) connected in parallel, where a first one of said two thermostatic switches closes said circuits for temperatures lower than said low temperature threshold, and where a second one of said two thermostatic switches closes said circuits for temperatures higher than said high temperature threshold.

10. Apparatus according to claim 1, for detecting when said appliance crosses a low temperature threshold and when said appliance crosses a high temperature threshold, said apparatus reporting any occasion on which a temperature of said apparatus crosses limits of a rated temperature range, wherein two distinct temperature detector members are provided, where a first one of said temperature detector members is set to said low temperature threshold and a second one of said temperature detector members is set to said high temperature threshold, each of said temperature detector members delivering a corresponding distinct alarm signal.

11. Apparatus according to claim 1, wherein said switch is a bimetal thermocontact (16).

12. Apparatus according to claim 1, wherein said switch is an electronic circuit (35) controlled by a thermistor (39) or by a thermocouple.

13. Apparatus according to claim 12, wherein a non-electronic auxiliary switch (47) closes at a temperature in the vicinity of said predetermined threshold said temperature not crossing said threshold, said auxiliary switch being connected in series with said electronic circuit (35) controlled by one of a thermistor and a thermocouple, wherein said circuit is powered only when said temperature approaches said predetermined threshold.

14. Apparatus according to claim 12, for preventing said electronic appliance from overheating while in use, wherein said electronic circuit controlled by one of a thermistor and a thermocouple delivers a signal representing an operating temperature of said electronic appliance, said signal representing the operating temperature of said electronic appliance being applied to an analog input of a microcontroller (2) for controlling said electronic appliance, wherein when said operating temperature exceeds a reference temperature, said microcontroller performs one of delivering a warning message and switching to a mode temporarily preventing any use of said electronic appliance.

15. Apparatus according to claim 14, wherein said reference temperature varies as a function of a temperature of an environment of said electronic appliance, wherein said microcontroller is controlled (2) only when a difference between said temperature of said environment and said operating temperature exceeds a predetermined limit value.

* * * * *